United States Patent
Oedl

(10) Patent No.: US 11,040,481 B2
(45) Date of Patent: Jun. 22, 2021

(54) LINEAR-MOTOR-DRIVEN SIMULTANEOUS STRETCHING INSTALLATION

(71) Applicant: BRÜCKNER MASCHINENBAU GMBH & CO. KG, Siegsdorf (DE)

(72) Inventor: Günter Oedl, Salzburg (AT)

(73) Assignee: BRÜCKNER MASCHINENBAU GMBH & CO. KG, Siegsdorf (DE)

( * ) Notice: Subject to any disclaimer, the term of this patent is extended or adjusted under 35 U.S.C. 154(b) by 416 days.

(21) Appl. No.: 15/511,786

(22) PCT Filed: Sep. 3, 2015

(86) PCT No.: PCT/EP2015/001778
§ 371 (c)(1),
(2) Date: Mar. 16, 2017

(87) PCT Pub. No.: WO2016/041620
PCT Pub. Date: Mar. 24, 2016

(65) Prior Publication Data
US 2017/0291349 A1 Oct. 12, 2017

(30) Foreign Application Priority Data
Sep. 18, 2014 (DE) ...................... 10 2014 013 901.8

(51) Int. Cl.
*B29C 55/16* (2006.01)
*B29C 55/20* (2006.01)

(52) U.S. Cl.
CPC .............. *B29C 55/16* (2013.01); *B29C 55/20* (2013.01)

(58) Field of Classification Search
CPC ................. B29C 55/20; B29C 55/16
See application file for complete search history.

(56) References Cited

U.S. PATENT DOCUMENTS

| 3,123,854 A | 3/1964 | Aykanian |
| 4,330,499 A | 5/1982 | Von Und Zu Aufsess et al. |

(Continued)

FOREIGN PATENT DOCUMENTS

| CN | 1030333 | 1/1989 |
| DE | 76 21 499 | 11/1976 |

(Continued)

OTHER PUBLICATIONS

Search Report issued in CN Appln. No. 2015800501614 dated Aug. 10, 2018.

(Continued)

*Primary Examiner* — Michael P Wieczorek
(74) *Attorney, Agent, or Firm* — Nixon & Vanderhye P.C.

(57) ABSTRACT

An improved method and an associated improved device for operating a linear-motor-driven simultaneous stretching installation is distinguished inter alia by the following features: during normal operation, the linear-motor-driven transporting units in the simultaneous stretching zone are subjected to an acceleration phase with a normal-operation acceleration profile involving a growing increase in the distance from a following transporting unit driven by the linear motor drive; when the web of material is moved into the stretching zone, at least two leading tenters, following one another and driven by the linear motor, are accelerated in the stretching zone in such a way that differs from the normal-operation acceleration profile that the distance formed between the at least two tenters following one another and driven by the linear motor is less than 80% or less than 75% of the distance that is brought about during normal operation.

10 Claims, 10 Drawing Sheets

(56) References Cited

U.S. PATENT DOCUMENTS

| | | | | |
|---|---|---|---|---|
| 5,072,493 A | * | 12/1991 | Hommes | B29C 55/165 26/72 |
| 5,939,845 A | | 8/1999 | Hommes | |
| 7,037,461 B1 | * | 5/2006 | Denker | B29C 55/165 264/210.5 |

FOREIGN PATENT DOCUMENTS

| | | |
|---|---|---|
| DE | 37 50 510 | 3/1995 |
| DE | 195 13 301 | 9/1995 |
| DE | 195 17 339 | 10/1995 |
| DE | 44 36 676 | 4/1996 |
| DE | 44 41 020 | 5/1996 |
| DE | 196 34 449 | 3/1998 |
| DE | 600 08 145 | 9/2004 |
| DE | 699 15 267 | 2/2005 |
| EP | 0 455 632 | 11/1991 |
| GB | 2 030 923 | 4/1980 |
| JP | 2003-531740 | 10/2003 |
| WO | WO 80/01149 | 6/1980 |
| WO | WO 88/10188 | 12/1988 |
| WO | WO 89/12543 | 12/1989 |
| WO | WO 90/09055 | 8/1990 |
| WO | WO 01/45920 | 6/2001 |

OTHER PUBLICATIONS

International Preliminary Report on Patentability issued in PCT/EP2015/001778 dated Mar. 21, 2017.
International Search Report for PCT/EP2015/001778, dated Nov. 18, 2015, 5 pages.

* cited by examiner

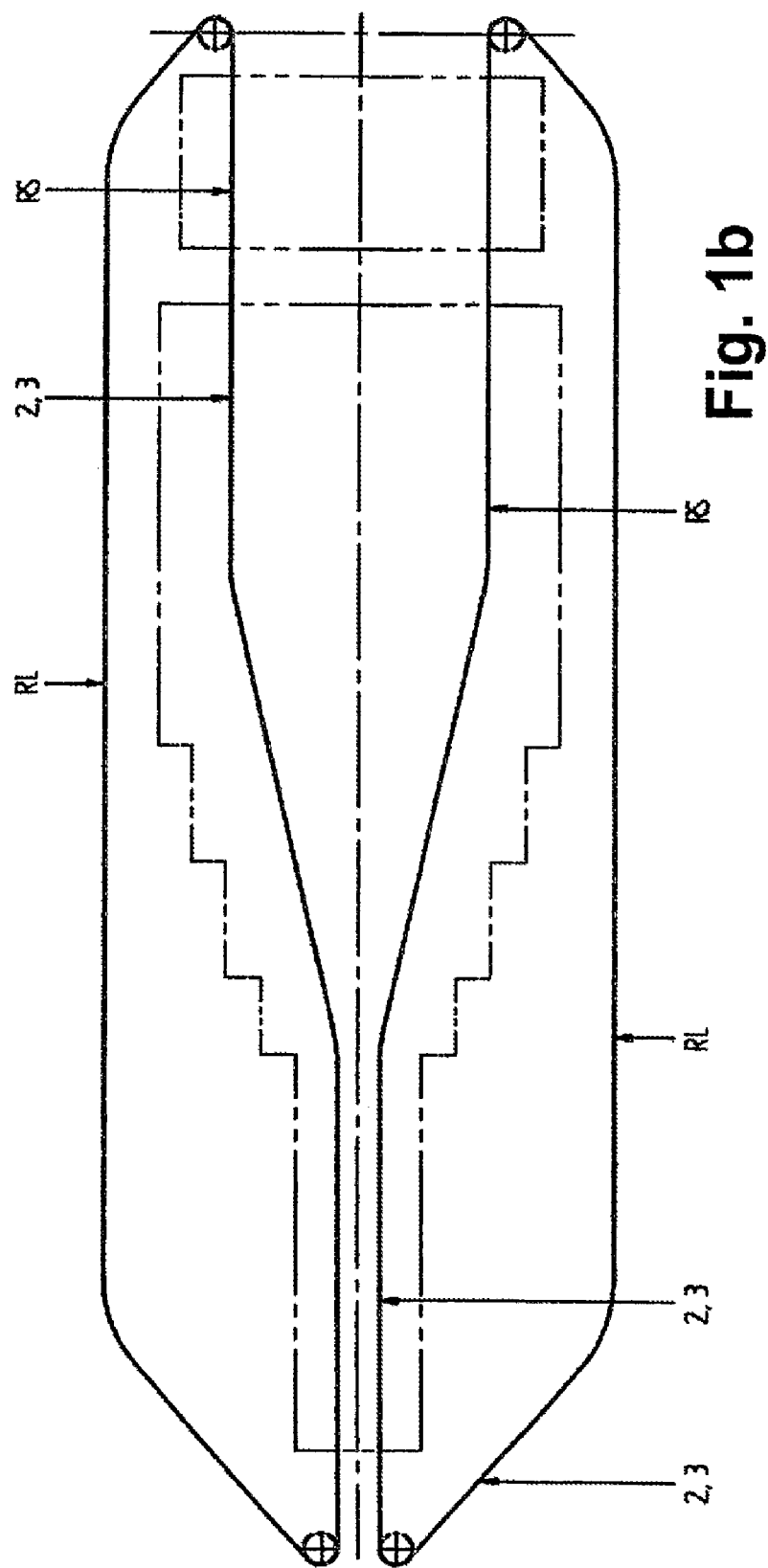

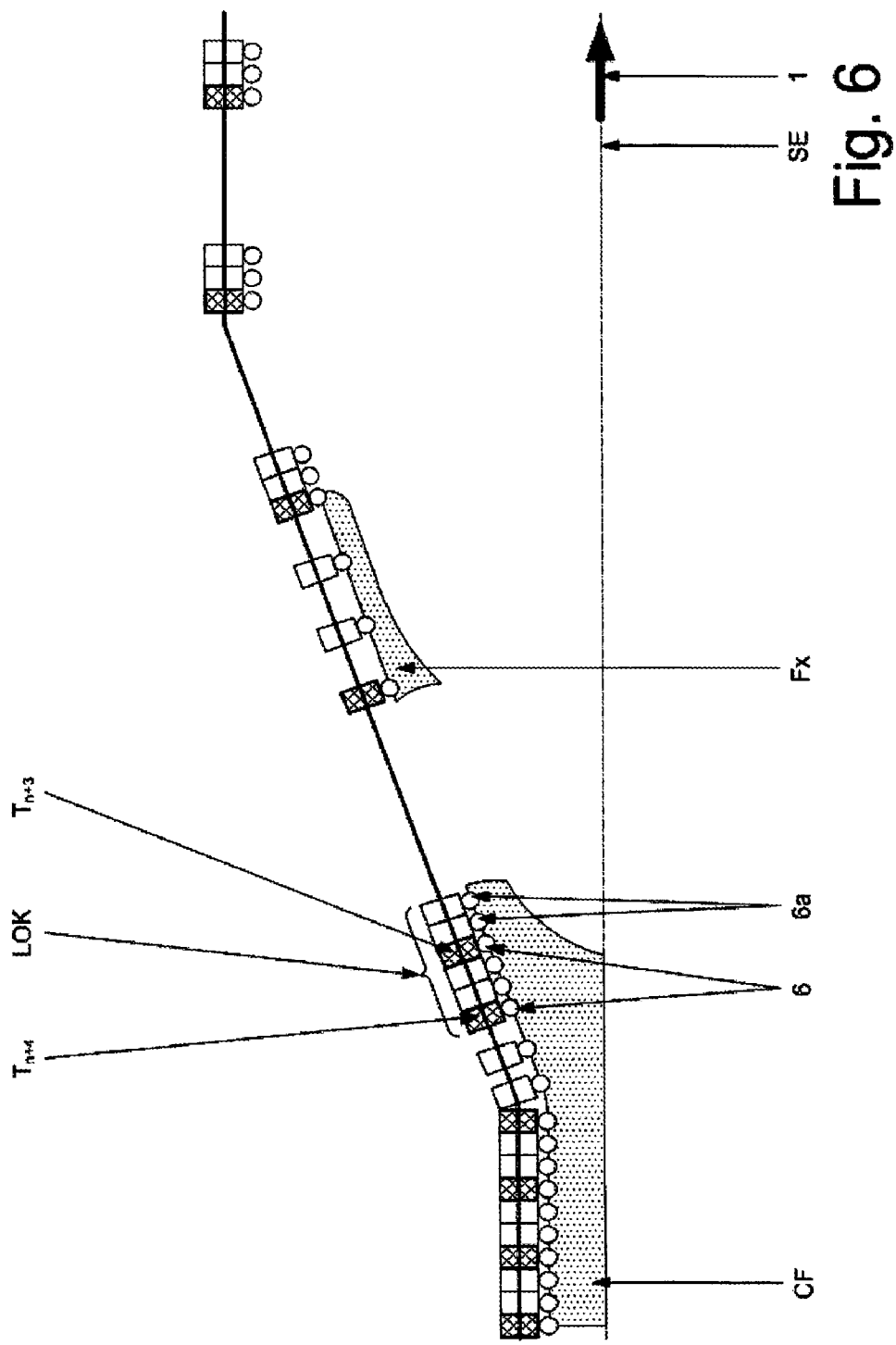

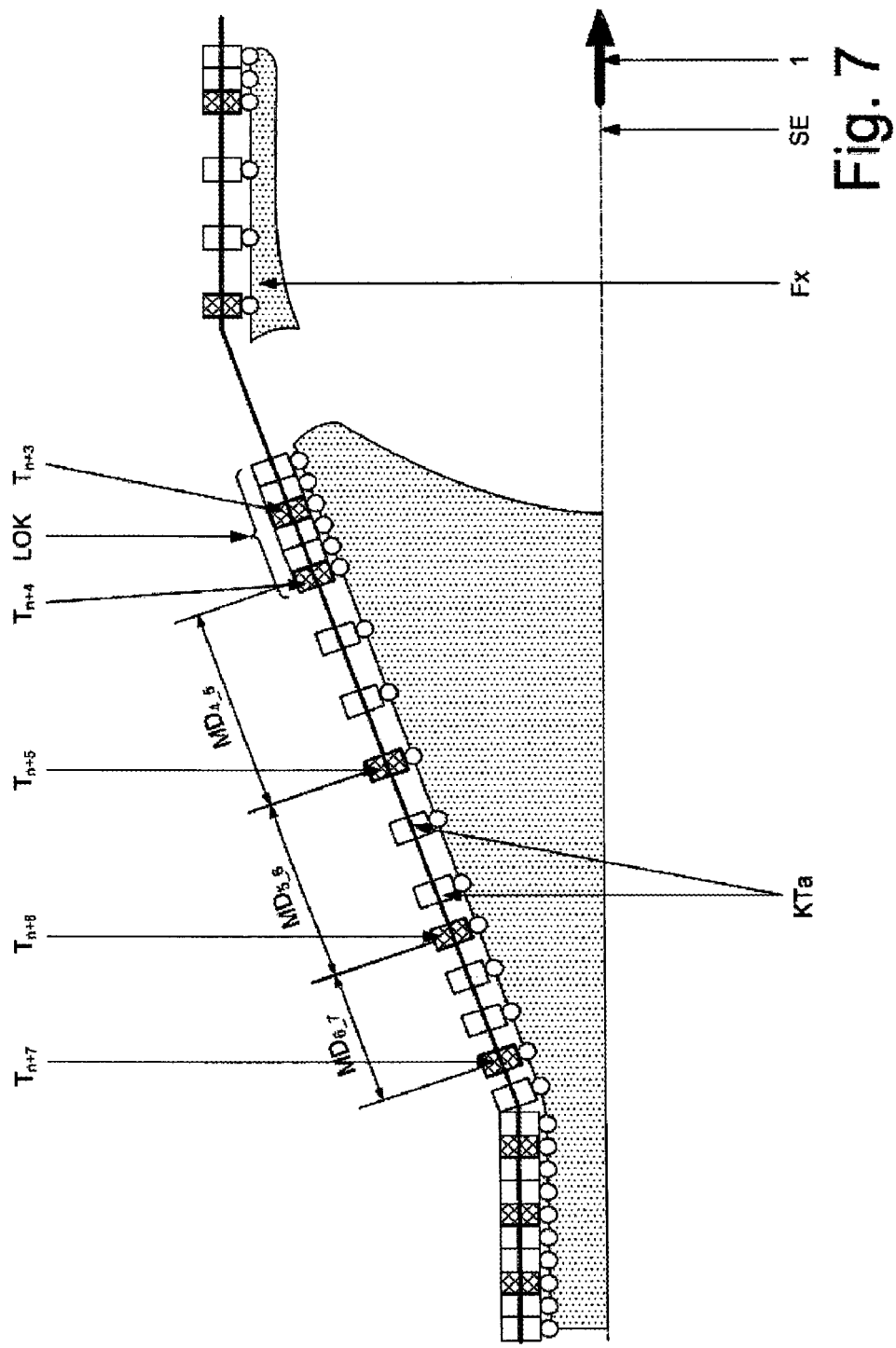

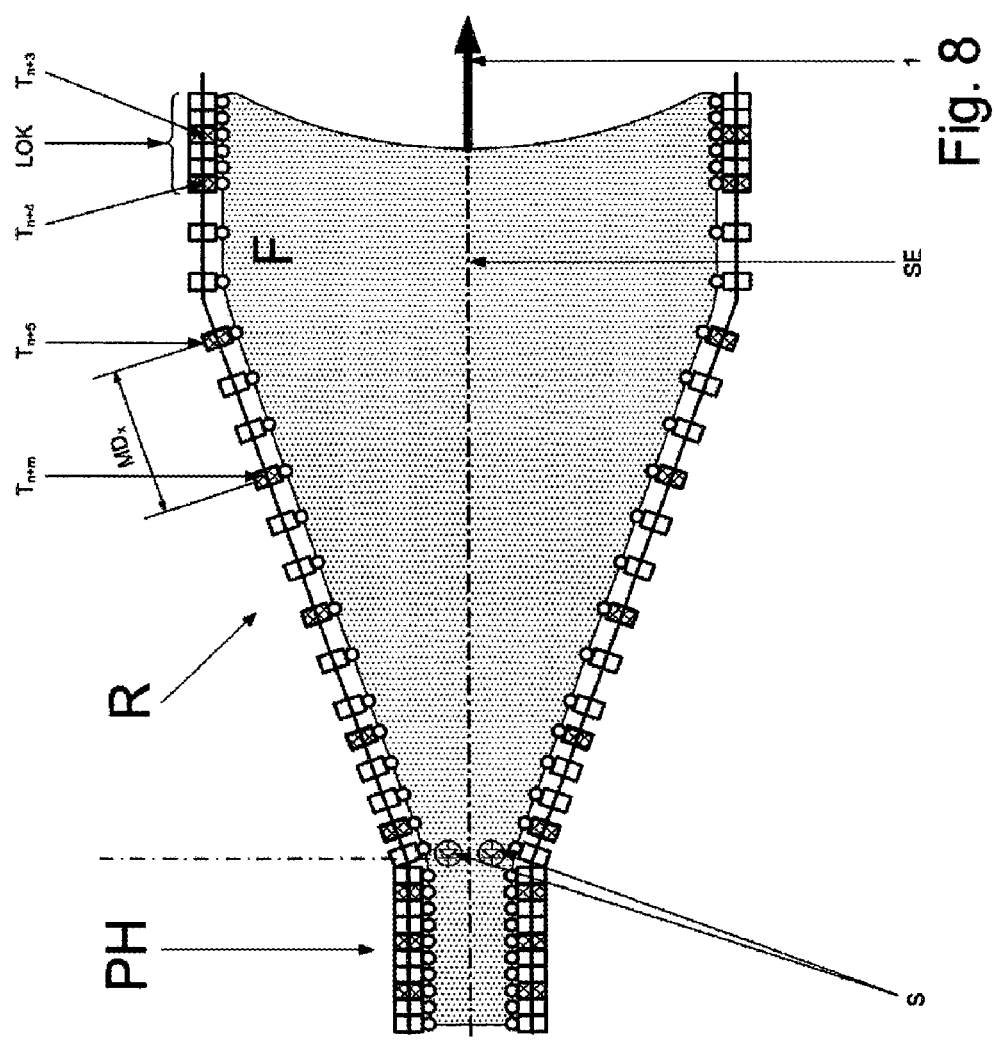

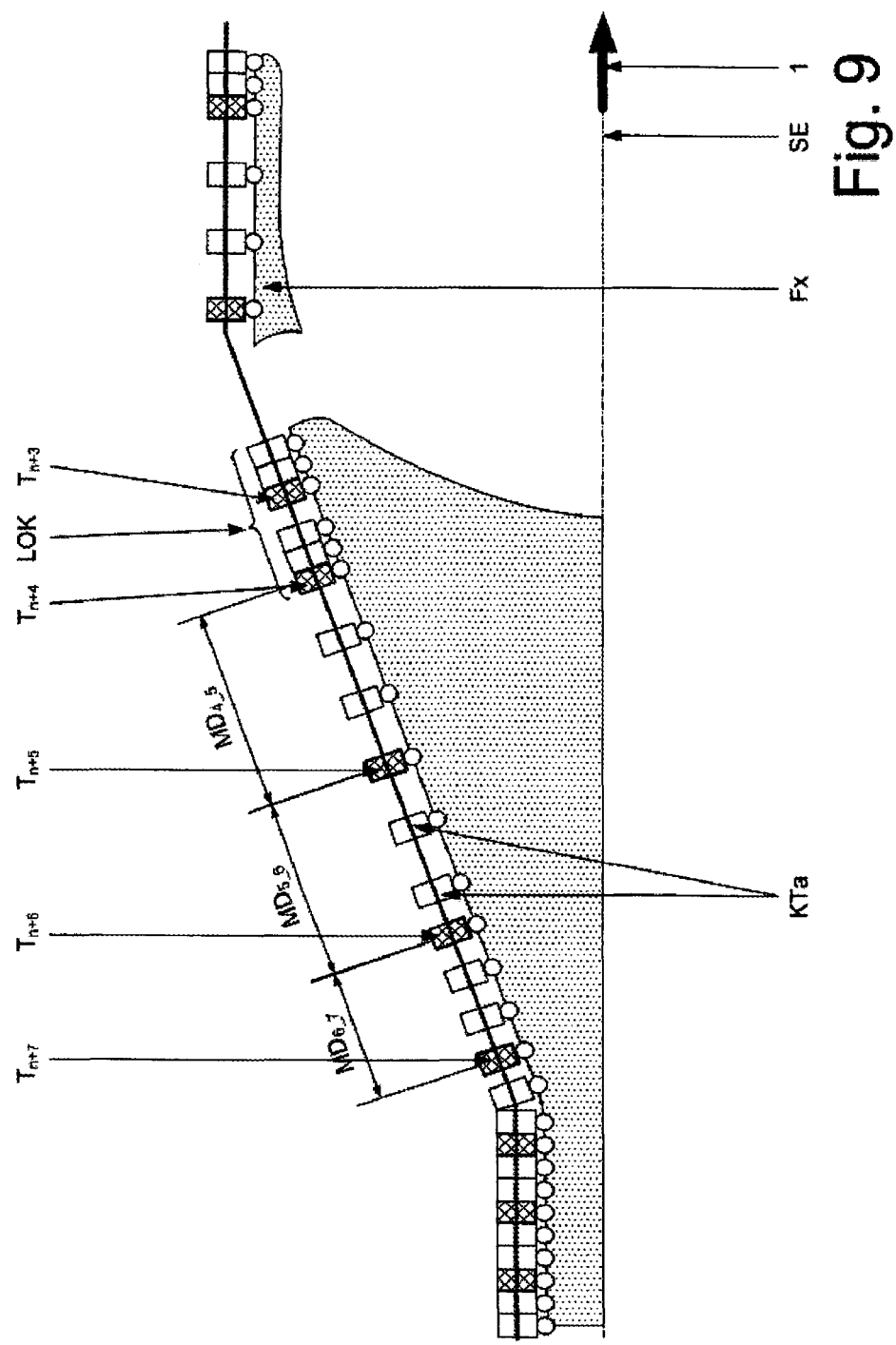

LINEAR-MOTOR-DRIVEN SIMULTANEOUS STRETCHING INSTALLATION

This application is the U.S. national phase of International Application No. PCT/EP2015/001778 filed 3 Sep. 2015, which designated the U.S. and claims priority to DE Patent Application No. 10 2014 013 901.8 filed 18 Sep. 2014, the entire contents of each of which are hereby incorporated by reference.

The invention relates to a method for operating a linear-motor-driven simultaneous stretching apparatus according to the preamble of claim 1 and to an associated simultaneous stretching apparatus according to the preamble of claim 8.

Stretching apparatuses are used in particular when producing plastics films. Simultaneous stretching apparatuses are known in which a plastics film can be stretched in the transverse direction and in the longitudinal direction simultaneously.

The material web to be stretched, i.e. usually a plastics film, is grasped by means of clips that are arranged on either side of the material web to be stretched so as to be movable on peripheral guide tracks. In this case, the clips are moved successively from an entry zone (in which the edge, for example, of a plastics film to be stretched is grasped) via a stretching zone (in which the opposing clips are moved away from one another on the guide rail portions having a transverse component diverging in relation to the transport direction), to a discharge zone, and then on a return path back to the entry zone, it being possible for the film to undergo a degree of relaxation and/or tempering, for example, in the discharge zone.

The simultaneous stretching apparatus mentioned at the outset, in particular in the form of a simultaneous stretching apparatus for producing plastics films, typically comprises two peripheral guide tracks that are arranged so as to be symmetrical to a vertical plane of symmetry, each guide track comprising a partially or completely peripheral guide rail, along which transport elements are moved on the guide track. These transport units typically comprise the above-mentioned clips, i.e. clip units and drive units, which are sometimes also referred to as transport parts. In this case, the transport parts can be guided and can absorb force on the guide rail by means of sliding elements, rolling elements or a combination of sliding and rolling elements. In principle, a magnetic suspension system along a guide structure should not be ruled out.

In simultaneous stretching apparatuses, the transport units are moved using linear motors. A linear-motor-driven transport system of this kind is known, for example, from WO 89/12543 A1 or from DE 44 41 020 C1.

These linear-motor-driven transport systems, and in particular stretching and simultaneous stretching apparatuses, are generally designed such that the clip part is connected to the drive unit or transport unit itself by means of a bridge. The drive forces are introduced, for example, by means of flange-mounted secondary parts, for example in the form of permanent magnets (using an associated magnet cage) that are attached to the drive units or transport units so as to be movable together therewith. In this case, idle running transport units, known as "idlers", which are not equipped with any secondary parts of this kind using permanent magnets, can also be provided between the transport units driven by a linear motor drive. Otherwise, however, the structural design of these non-driven transport units corresponds to that of the driven transport units, and introduced film forces are also moved together therewith over the material web to be stretched, usually over the plastics film to be stretched, since the corresponding clips grasp the film edge as the film web travels in the withdrawal direction. The transport units driven by the linear motor thus move the plastics film to be stretched through the film apparatus by means of the clip units, the non-driven transport units located between said driven transport units then being moved together therewith over the plastics film that is moved through the apparatus.

Advancement using permanent magnets, i.e. the transport units equipped with secondary parts, is carried out by means of primary parts or units, i.e. stationary coils and windings that are provided along the guide track and by means of which corresponding electromagnetic fields can be produced, by means of which fields the transport units equipped with the permanent magnets (secondary parts) can then be advanced along the guide track.

PRIOR ART

Chain-linked synchronous linear motor systems, as are known from DE 196 34 449 for example, comprise, as primary parts, a plurality of zones that comprise stator windings and are connected in series, which stator windings can be activated at different phase angles with predeterminable current amplitudes. In this case, activation is carried out by means of converters or frequency converters that comprise a corresponding output stage, power stage or driver stage, or downstream of which a stage of this kind is connected.

The secondary parts can then be moved along these primary parts, i.e. along the linear motor path that comprises the stator windings and is divided into a plurality of zones connected in series, by means of the magnetic field generated by the primary parts. In the case of film stretching apparatuses, said secondary parts are what are known as clips.

At the end of each loop, the film web that is now advancing at a higher speed than at the entry is released from the carriages, and the carriages are returned to the start of the loop where the film web is grasped again and stretched by the separating and accelerating carriages.

On the return side of each loop, the clip carriages must be decelerated from the film web release speed to the film web grasping speed, the carriages backing up into one another at said grasping speed.

A linear-motor-driven film web stretching apparatus of this kind having the carriage control described above is known from U.S. Pat. No. 5,072,493. Additional details of and improvements to a system of this kind are also known from DE 44 36 676 A1 (regarding clip carriages), DE 195 13 301 A1 (regarding the speed adjustment of carriages that are movable along a rail arrangement), DE 195 17 339 A1 (regarding rail transitions in a discharge curve), and DE 699 15 267 T2 (regarding the control of clip carriages on the return side in simultaneous biaxial stretching apparatuses). Reference is made in this respect to the disclosure of these publications.

Against this background, the object of the present invention is that of providing an improved simultaneous stretching method and an associated improved activation device for carrying out a stretching method of this kind, which method is advantageous compared with conventional solutions in particular when starting a process of stretching a material web.

With regard to the method, the object is achieved in accordance with the features set out in claim 1, and with regard to the simultaneous stretching apparatus, the object is achieved in accordance with the features set out in claim 8. Advantageous embodiments of the invention are set out in the dependent claims.

The present invention relates to controlling clip carriages in simultaneous biaxial stretching apparatuses for stretching material webs and in particular plastics film webs, in which clip carriages comprising the above-mentioned clips and the associated drive units are driven independently of one another in two opposing endless loops.

The present invention relates in particular to stretching apparatuses that use linear motors for advancing the carriages through the entirety of the endless loops. On the inwardly facing sides of the two loops, the film web is grasped by clips on the carriage at the entry point of each loop and stretched in the longitudinal direction by the individual carriages being accelerated, as a result of which the distance therebetween increases.

At the same time, the carriages can be moved apart laterally, as a result of which, for example, the film web is laterally stretched.

Within the context of the present invention, significant advantages can be achieved compared with conventional solutions, in particular in the starting phase of a stretching process.

Specifically, it has been found that problems can arise when using conventional simultaneous stretching apparatuses.

Usually, during the simultaneous stretching process, a transport part that is driven by a linear motor and is provided with a clip is advanced in a sine wave along the guide rail. According to the design of the linear motor, a film can be moved forwards or stretched by a maximum pull-out force. If the force exerted by the film is greater than the maximum pull-out force, a following driven clip, i.e. a following driven transport part, is torn out of the sine wave in question and jumps into the next sine wave of the linear motor. The following clip in each case, i.e. the following transport unit in each case, thus leaves its actual position, with the result that the material web, and in particular a plastics film, either tears at an unspecifiable position or is pulled out of the clips on the corresponding transport unit.

If the force of the material web, and in particular of a plastics film web, is greater than the maximum pull-out force, then the situation is similar for all the subsequent clips of the following transport units. It is then no longer possible to pull the material webs, and in particular a film, into the stretching zone.

Against this background, the invention provides an improved method and an improved activation device.

The invention is based on the concept of accelerating, in a deviation from normal operation, in the stretching zone and after a first actively driven transport unit having associated clips, at least one further following actively driven transport unit provided with a further clip, preferably accelerating said units together, in the material web longitudinal direction (i.e. in the machine longitudinal direction MD) during the start of the process, or in the event of a tear in the material web that has occurred in particular during the start of the process.

The result of this is that the at least two actively driven clips preferably maintain their relative spacing from one another, and therefore stretching does not occur in the machine longitudinal direction MD (i.e. the pull-out direction in the material web), but merely in the direction transverse thereto (TD direction) in the region in which the above-described clips grip the material web in order to stretch it.

Since, in this case, the spacing between the at least two transport units and thus between the at least two successive clips is minimal, the MD force that usually occurs there and the force (TD force) of the material web, in particular of the film, acting in the transverse direction over a plurality of individual clips is distributed in a track portion in question. As a result, the force on the guiding part of the material web, and in particular on the guiding part of the film, can be noticeably reduced. Consequently, the risk of a possible tear of the material web and in particular of the film is significantly minimised, and therefore the start of a material web can be pulled through the stretching zone without any problems.

In this case, a further actively non-driven transport unit and clip, for example two or more actively non-driven transport units and clips, may be included between the at least two clips of the combined transport units that are combined into what is known as a super clip (overall pulling assembly), which further transport units and clips are provided in the sense of a combined "super clip" between the at least two actively driven clips on either side of the peripheral track.

However, a moderated version of the principle according to the invention can also be implemented if at least one first actively driven clip on each guide track and at least one following active clip in the simultaneous stretching zone are accelerated relative to one another "in a moderated manner" such that, during the acceleration phase in the simultaneous stretching zone, the spacing between the leading clip and the next following active clip is smaller than during normal operation. Although stretching forces in the machine longitudinal direction are thus also introduced to the material web between the two clips that are less accelerated relative to one another according to the invention, significantly lower longitudinal stretching forces are introduced compared with the longitudinal stretching forces that act on a material web in the stretching zone during normal operation.

A correspondingly constructed and adjusted activation unit can implement this activation accordingly.

The invention will be described in greater detail in the following with reference to drawings in which, in detail:

FIG. 1*a* is a schematic plan view of a simultaneous stretching apparatus, in which the return side together with the advance side is arranged so as to extend inside an oven;

FIG. 1*b* shows an embodiment that is modified compared with FIGS. 1*a* and 1*n* which the return side is separated from the process side and extends outside an oven;

FIG. 2 is a schematic cross section, transverse to the longitudinal direction of a guide rail, of a simultaneous stretching apparatus that is shown schematically in FIGS. 1*a* and 1 *b*, illustrating the structure of a clip transport unit;

FIG. 3 is a schematic enlarged detail of the view according to FIG. 1*a*, illustrating a movement and acceleration profile of actively driven transport parts comprising associated clips and non-driven transport parts comprising associated clips (idlers) in the region of the entry zone, the stretching zone and the following post-treatment zone during normal operation when the material web has not yet been grasped;

FIG. 6 is a view comparable to the preceding figures with regard to a solution according to the invention in which a leading material web portion or film portion is grasped and pulled into the stretching zone;

FIG. 7 is a view corresponding to FIG. 6 at a later point in time, in which the overall pulling assembly that comprises a plurality of clips together and is provided within the context of the solution according to the invention has already advanced almost to the end of the stretching zone;

FIG. 8 is a view corresponding to FIG. 7 at a later point in time again, in which the overall pulling assembly provided within the context of the solution according to the invention has already left the stretching zone; and FIG. 9 is a view comparable to the preceding figures with regard to a modified embodiment.

The linear-motor-driven transport and/or stretching apparatus discussed in the following is described on the basis of a simultaneous stretching apparatus.

Figure 1A:
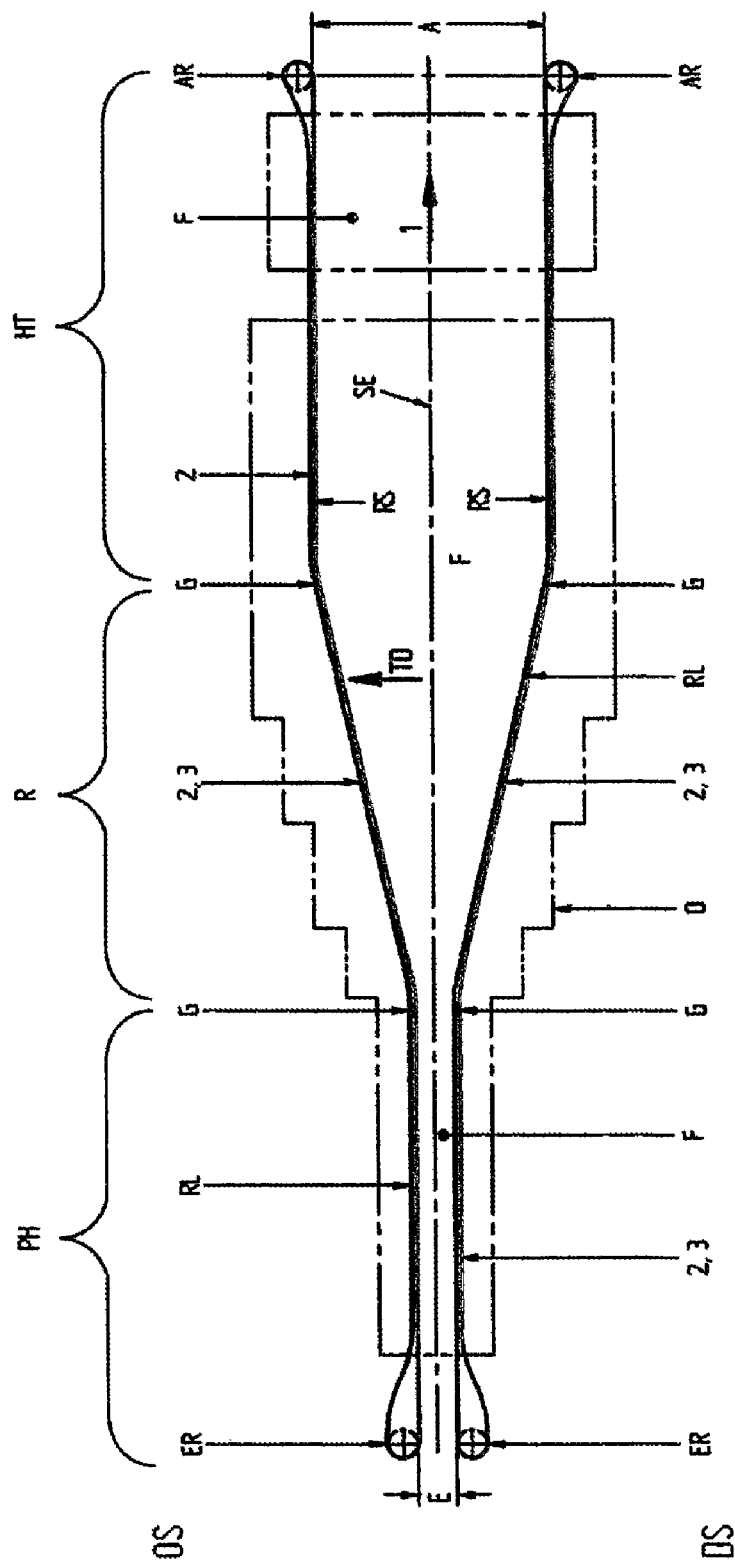

A stretching apparatus of this kind comprises two symmetrical drive systems that are positioned so as to be symmetrical to a central plane of symmetry SE extending vertically with respect to the drawing plane. The two drive systems arranged symmetrically to the plane of symmetry SE in the withdrawal direction 1 are shown in FIG. 1a, the material web to be treated, i.e. to be stretched, in particular in the form of a plastics film F, being moved through in the withdrawal direction 1 between the two drive systems that circulate on closed tracks 2.

Figure 2:
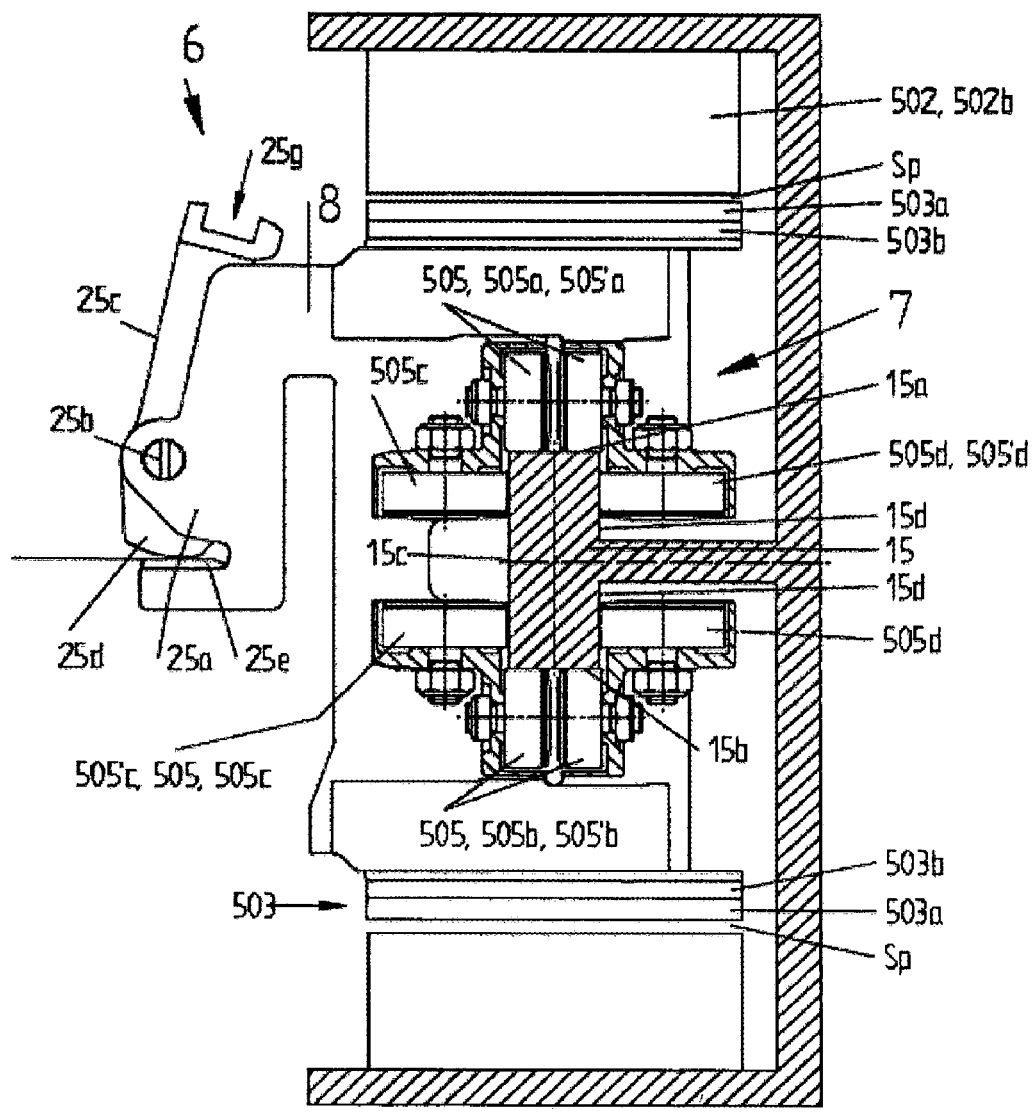

An unstretched film F ("film" always being referred to in the following, even though a treatment web F in general can be correspondingly treated and simultaneously stretched in the longitudinal and transverse directions in a stretching apparatus of this kind, meaning that the invention is not restricted to a plastics film web in this respect) enters the stretching apparatus in an entry region ER and is grasped and clamped there at both edges 8 on the stretching or process side RS by means of clips that will be described in the following and as are shown in FIG. 2 for example, specifically grasped and clamped on what is referred to as the operator side OS and on the drive side DS. The film F is then heated in a following pre-heating zone PH and subsequently fed to a stretching zone R in order to be stretched there in the longitudinal and transverse direction simultaneously. The stretched film F then travels through various heat-treatment zones HT in which the film can also be relaxed. In the delivery region AR of the stretching apparatus, i.e. at the end of what is known as the discharge zone A, the film is unclipped using suitable means and then leaves the simultaneous stretching apparatus.

Otherwise, as is also shown in FIG. 1b, the guide rail can extend differently in the advancement direction and thus the stretching region and in the return region, specifically such that, for example, only the guide rail extends through an oven O and is returned on the return side RL outside the oven. Reference is made in this respect to known stretching apparatuses and associated superstructural parts.

Reference is made in the following to FIG. 2, which is a cross section of a linear-motor-driven simultaneous stretching apparatus comprising an associated clip part and transport part.

FIG. 2 thus shows a clip/transport unit T that comprises a clip part 6 and the transport part 7. The clip part 6 is connected to the transport part 7 by means of a bridge 8. Depending on the perspective, the clip bridge 8 can be included in the transport part or in the clip part.

As usual, the clip part comprises a clip lever 25c, which is also sometimes referred to as a blade flap 25c. In the case of a film stretching apparatus, a film F is fixed, i.e. clamped and retained, between the gripping surface 25d and a clip platform 25e.

A U-shaped magnetic closure part 25g opens and closes the clip lever and thus clamps or releases the film, together with a corresponding device according to the prior art (not shown).

The actual construction of the linear-motor-driven simultaneous stretching apparatus comprising the corresponding linear motor drive is known for example from EP 0 455 632 BI or DE 44 36 676 C2, with reference being made to the entire disclosure thereof. The view shown in cross section in FIG. 2 shows the guide and support rail 15.

In the embodiment described, in each case at least one pair of rollers 505 runs on each running surface, specifically an upper roller pair 505a that rotates about a horizontal axis. This roller pair bears and supports the total weight of the associated transport part and the clip part connected thereto.

This roller pair 505b merely ensures the running reliability.

Finally, a roller pair 505c is also provided on the clip side and, opposite thereto, a roller pair 505d is provided that rolls on the relevant vertical running surfaces 15c and 15d. The transport part 7 is guided and mounted thereby. The corresponding guide rail 15 is retained at intervals by a plurality of horizontal carriers that are offset in the longitudinal direction of the guide rail, each extend between the upper and lower roller 505d in the space 401 remote from the clip, and are rigidly connected to the guide rail.

The corresponding transport part is driven by means of linear motors that comprise stationary primary parts 502 and secondary parts 503 that are movable together with the clip/transport parts T. In other words, the clips, i.e. the clip 6, together with the transport parts 7, are moved longitudinally by means of the primary parts 502 and the secondary parts 503 along the guide rail 15 that, in this case, is also simultaneously used as the transport rail 15 (monorail).

The primary parts 502 mentioned are attached in parallel with the guide and support rail 15. The secondary parts 503 consist of the mentioned permanent magnets 503a that are fastened in respective retaining cages 503b that are in turn retained on the clip body 6.

As can be seen in FIG. 2 and in the following figures, a (small) spacing gap Sp is formed between the primary and secondary part 502, 503, across which gap the electromagnetic waves generated by the primary part act on the permanent magnet 503a on the transport part and thus move the transport part in the advancement direction.

In the following, the process of starting to stretch a material web in general, and a film (plastics film) in particular, is discussed on the basis of FIG. 1a and FIG. 3, which shows a schematically enlarged detail from FIG. 1a. A pre-film is to be understood to mean a cast film CF for example, as is extruded from a flat slotted nozzle and cooled, but can also be understood to mean material webs that have been produced and pre-treated in other manners, such as uniaxially stretched films, coated films etc.

For example, in accordance with the view in FIG. 1a, a cast film CF is clamped in the entry zone ER of width E by means of clips 6 (that are retained by transport parts 7 and moved along the guide track or guide rail 2 in the movement direction FS) and is transported through a pre-heating zone PH while heat is supplied. Generally, the transport units T consist of at least one driven transport part 7 comprising at least one secondary part 503 of the linear motor (FIG. 2). In addition, non-driven transport parts 7a (idlers) can be arranged between the driven transport parts 7, which non-driven parts can also be moved by means of the grasped material web F in general and the described film F in particular.

At the end of the pre-heating zone PH, the film is stretched in the machine direction MD and the transverse direction TD of the film, in what is known as the stretching zone R. Stretching in the TD direction (transverse direction transverse or perpendicular to the MD direction) is achieved by means of an inclination a of the guide rail 15.

Stretching in the MD direction is achieved by the driven clips Tn, n∈N being accelerated along the guide rail 15 relative to the following driven clip Tn−1 in each case until the desired stretching ratio MDx of the film in the machine direction MD is reached.

Figure 3:
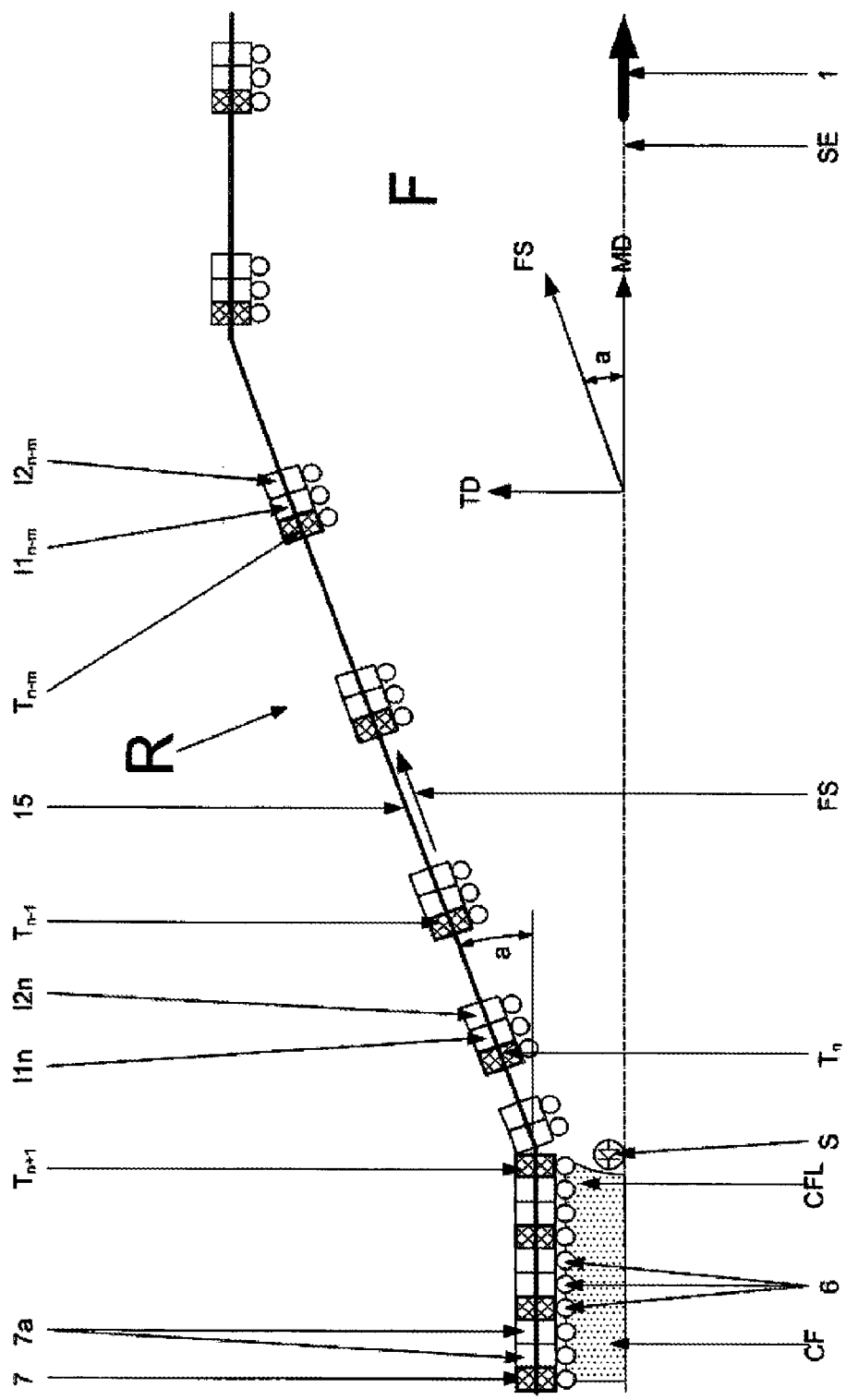

FIG. 3 schematically shows the situation during the approach of the pre-film CF when the pre-film CF, i.e. the start CFL thereof has for example been clamped in the actively driven clip Tn+1, has just reached the end of the pre-heating zone PH. The clips Tn−m, m=1, 2, etc. have already been accelerated to the desired stretching ratio MDx. Since no film has yet been clipped in the clips Tn−m, the non-driven idlers, i.e. non-driven clips 7a, of which there are two per each driven clip in the embodiment shown and which are denoted I1n−m and I2n−m in the view according to FIG. 3, are simply moved forwards together with the driven clip Tn−m.

Figure 4:
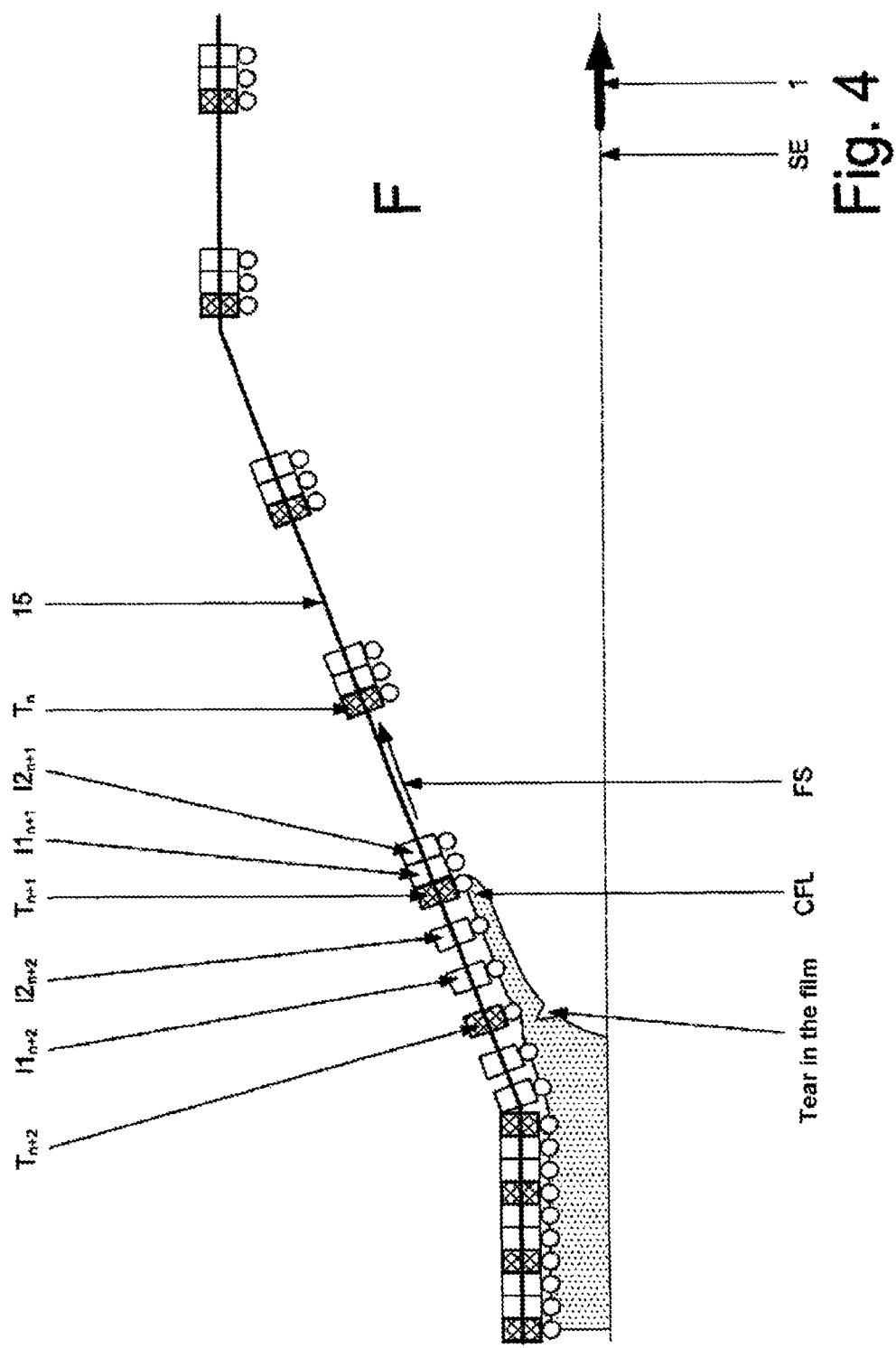
FIG. 4 is a view similar to FIG. 3, illustrating the method steps when a leading starting portion of a material web is grasped in the transition region to the stretching zone and pulled into the stretching zone during normal operation.

FIG. 4 shows how the start of the film CFL is accelerated by the driven clip Tn+1 and is moved along on the guide track or guide rail 15 and stretched in the direction of the arrow FS. In front of the first actively driven clip Tn+1 that grasps and clamps the start of the film CFL, the two idle running and non-driven clip carriages (transport units T comprising the transport parts 7 and the clips 6 retained thereby) I1n+1 and I2n+2 (since they do not clamp a film edge) located in front of said actively driven clip Tn+1 are driven and moved forwards, in direct contact, by means of the actively driven clip carriage Tn+1, said carriages being directly in contact with, i.e. abutting, the driven clip carriage. The same applies to the following clips Tn+m, m=1, 2, etc.; the non-driven idlers I1n+2 and I2n+2 (there may also be just one idler or no idlers at all) are oriented according to the forces acting in the film.

However, a tear in the film (shown in FIG. 5) may now occur during this initial process of stretching the material web F, since the described driven transport parts 7 that accelerate the clips 6 in the stretching zone R are advanced along the guide rail 15 in a sine wave. In this case, the advancement forces are applied by the described primary parts on which the secondary parts fastened to the transport parts 7 act, and thus move the transport parts 7, including the secondary parts and the above-mentioned clips, along the guide track 15 and accelerate them accordingly in the stretching zone. In this case, as explained, according to the construction of the linear motor, a material web F can be moved forwards and stretched only by a maximum force (pull-out force). However, there are cases in which the force exerted on the material web F is greater than the maximum drive force (pull-out force) of the linear motor drive. This ultimately results in a clip Tn+2, for example, being torn out of the sine wave in question and jumping into the next sine wave of the linear motor. Consequently, the following clips Tn+2 also leave their original position, with the result that the film either tears at an unspecifiable position or is pulled out of the clip. This is indicated by way of example in FIG. 5, in which the trailing end Fx of a portion CWA of the film that was initially stretched in the longitudinal and transverse direction (ND and DD direction) is torn (the clamped and accelerated film being shown only schematically in FIG. 5).

In order to make the system operational, according to the invention an overall clip LOK is assembled from a plurality of driven leading transport units T, i.e. at least two active driven and leading transport units T are assembled to form the mentioned overall clip LOK that is sometimes referred to in the following as the super clip, "locomotive" or overall pulling assembly (FIGS. 5 to 8). Within the context of the invention, this super clip or "locomotive" LOK is thus treated in one embodiment as a single clip. Said clip is thus moved in the manner of a single clip 6 through the entire stretching apparatus from the start of the stretching zone R. In other words, this overall clip or this "locomotive" LOK, which, as explained, comprises at least two actively driven transport units TE having associated clips 6, is accelerated to the desired longitudinal stretching speed MDx, moved through the stretching zone R and the following zones (discharge zone A), in order to then optionally subject the material web to relaxation. After the described super clip or the "locomotive" LOK has left the stretching apparatus at the discharge region AR, the super clip LOK is dismantled in a control process during the return RL.

In this case, the start of the film CFL is stretched only in the TD direction, but not in MD. Since the clip spacing within the individual clips of the super clip LOK is minimal, the MD and TD force of the film is distributed among a plurality of individual clips. This makes it possible to noticeably reduce the force on the guiding part of the film and the super clip LOK. It is thus possible to move the start of the film through the stretching zone R.

In order to achieve this, the individual zones in the stretching region have to be synchronised for this super clip LOK in order to keep the spacing between the individual clips constant and to then accelerate or move the super clip LOK along the guide track 2, i.e. the guide rail 15, in the manner of an individual clip.

Figure 5:
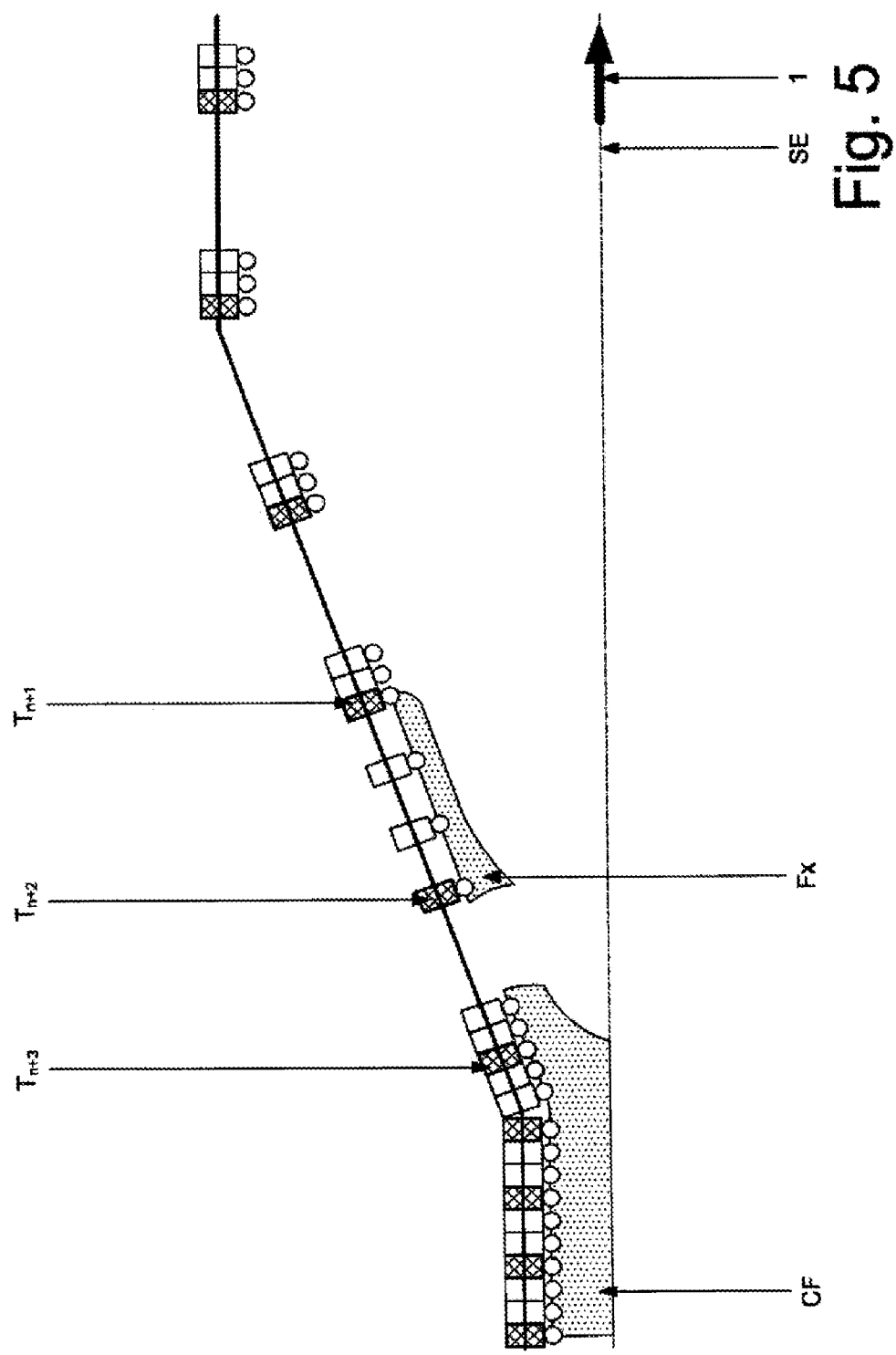
FIG. 5 is a view that builds on and is comparable to FIG. 4, illustrating how a tear in the material web or the film appears.

FIG. 5 shows a super clip LOK of this kind, consisting of the driven clips Tn+3 and Tn+4 and the corresponding idle running, non-driven clips 16a or transport parts 7a (idlers) thereof in the formation phase thereof, specifically following a previously occurring tear in the film.

Since the embodiment described relates to linear-motor-driven transport units T comprising the transport parts 7 and the associated clips 6, a linear motor path is formed along the guide track or guide rail 15 and comprises the above-mentioned stationary primary part and the transport units that can be moved relative thereto by means of the secondary parts. In this case, the primary part is divided into a plurality of zones which are connected in series (chain-linked) and which, as set out above, need to be correspondingly synchronised in order to drive what is known as a super clip LOK. The above-mentioned zones, in particular the stretching zone, but also the discharge zone, generally comprise, in a known manner, stator windings for generating a wandering magnetic field by means of which the above-mentioned secondary parts, in the form of the transport units and the associated clips, can be moved. As mentioned, in this case the secondary parts generally comprise permanent magnets.

In order to activate (by means of an activation device AE) the individual linear synchronous motor path portions that are divided into zones, the individual zones are each associated with converters or frequency converters. Moreover, the activation unit AE comprising the converters or frequency converters is designed such that the converters or frequency converters comprise an output stage, power stage or driver stage, or that said output stage, power stage or driver stage are connected downstream of the individual converters or frequency converters. In addition, said converters or frequency converters generally comprise what are known as profile generators, which calculate generated time values for a phase angle and a current amplitude, on the basis of a time-pulse generator and in a time-dependent manner in each case. Accordingly, the individual stator windings of the primary parts are activated. Since in particular the stretching zone also comprises a plurality of successive activation zones of this kind, the individual transport units and the associated clips can be activated accordingly so as to have a specified speed profile and/or acceleration profile on the basis of a specified phase profile. Regarding the further construction for another mode of operation of a linear motor drive of this kind, reference is made to known solutions, in particular to DE 196 34 449 A1, the disclosure of which is the content of the present application.

Normal Operation:

During normal operation without the super clip LOK, one zone (or one frequency converter) in each case is responsible for precisely one task for all transport parts 7 and the associated clips 6, which task is constantly repeated. Each transport part 7 and the associated individual clip 6, which transport part is equipped with a secondary part and is driven together with the primary part by means of a linear motor drive, has to complete exactly the same defined stretching curve or the same defined movement and/or acceleration profile, which curve or profile is zone or position-dependent.

Operation According to the Invention:

In the case of a super clip LOK (i.e. the described overall pulling assembly LOK), however, a plurality of zones (frequency converters) now have to be synchronised with one another, since a plurality of actively driven transport parts 7 now have to be simultaneously synchronised with and accelerated or moved together with the respectively associated individual clips 6. Within the context of the described overall clip or super clip LOK, the movement and/or acceleration profile of an individual transport part 7 and the associated individual clip 6 is now different from the leading or trailing actively driven transport parts 7 and the associated clips 6 within the pulling assembly (and this also applies in principle to the idle running, i.e. non-driven, idlers). The different stretching curves are necessary in order for it to be possible to produce the formed overall clip or super clip LOK and in order to move said overall unit LOK forwards in a synchronised manner.

For this purpose, the last driven clip in the overall clip, i.e. the super clip LOK, is used as a master drive (in FIG. 5 this is the separately denoted transport unit Tn+4 and the associated clip $6n+4$), which clip is also referred to as the trailing clip in the LOK unit. In principle, any other transport unit and any other clip in the overall unit LOK can also fulfil the master drive function.

In order to start the pulling formation, i.e. the formation of an overall or super pulling assembly LOK, a trigger signal is required, which can preferably be generated by a sensor (e.g. PIN, cap sensor, etc.) at the entry of the stretching zone, i.e. at the end of the pre-heating zone PH. A sensor S of this kind is shown at the corresponding point in FIG. 3 for example.

Since the super clip LOK can pull the start of the film CFL (which may also be a new start of the film CFL following the occurrence of a tear in the film) through the stretching zone R by means of the leading transport units T, the following transport units T having the transport parts 7 and the clips 6 can travel the normal stretching profiles, which applies to the actively driven transport parts 7 and the associated clips 6.

Once the edge 8 of the material web to be stretched has been grasped, the non-driven idle running transport units Ta having the transport parts 7a and the clips 6a (which are also referred to as idlers) are each also moved and accelerated, as usual, at an intermediate acceleration in the stretching zone between two actively driven transport units T.

FIG. 7 shows a situation at a later point in time than that represented in FIG. 5 and FIG. 6, at which the overall clip LOK that has been coupled together to form an overall pulling unit has already travelled almost all the way through the stretching zone R, and the following idle running idlers 7a or Ta and the following additional driven transport units 7 are driven in the stretching zone so as to have a conventional movement and acceleration profile. In this case, FIG. 7 shows, in the form of the corresponding MDx_y values for the position-dependent and/or zone-dependent spacings, the spacings that occur between two successive driven transport parts 7 on account of the position-dependent or zone-dependent acceleration profile (i.e. the spacings that result because the corresponding actively driven transport units T having the transport parts 7 and the clips 6 are not coupled together to form the mentioned overall pulling unit LOK). It can be seen therefrom that, as the film travels through more of the stretching zone due to the acceleration that increases from the start to the end of the stretching zone, the spacing between two successive actively driven transport units T having the associated transport parts 7 and the associated clips 6 is greater the closer a pair of this kind consisting of driven transport parts 7 and the associated clips 6 comes to the end of the stretching zone R.

FIG. 8 shows a summary of the situation after the overall pulling assembly LOK according to the invention has left the stretching zone R.

The fact that, in the region of the leading overall pulling unit or overall clip (super clip) LOK, stretching of the material web occurs only in the transverse direction TD and not in the machine longitudinal direction MG, is indicated in the drawings by film bulges 1' that are located one behind the other in the withdrawal direction 1.

In summary, it can thus be seen that, in order to initialise a stretching process in the region of a leading material web portion CFL in the form of the above-mentioned pre-film CFL in the embodiment described, an overall clip/pulling assembly LOK in the sense of an overall clip is formed, which comprises more than one individual transport unit 7/clip 6 that can otherwise be individually activated. Within the context of the invention, this leading overall clip/pulling assembly LOK is accelerated and moved through the stretching apparatus at least as far as the discharge end and in particular the stretching zone R as a virtually coherent and usually contiguous unit and so as to have a shared movement profile (stretching profile) that is specified in the embodiment described. The individual clips (both the driven active individual clips 6 and associated transport parts 7 and the non-driven clips 6a and associated non-driven transport units 7a) following this overall pulling assembly LOK are moved through the apparatus as in normal operation.

In the embodiment shown, an overall pulling assembly has been selected using two actively driven leading transport parts 7 and associated clips 6. However, the number can also be selected to be different, i.e. for example 3, 4 or more individual actively driven transport units T and associated clips 6 can be combined to form an overall clip/pulling assembly LOK.

Likewise, the described leading overall clip/pulling assembly LOK can be formed using only actively driven transport parts 7 and associated clips 6. It is also possible for just one non-driven leading transport part 7a and the associated non-driven clip 6a to be located between two actively driven transport parts 7 in each case. However, a plurality of idlers can be used here, for example two, three or more non-driven transport units Ta having transport parts 7a and associated clips 6a. The described embodiment has been described for two idlers, i.e. idle running transport parts 7a having associated clips 6a, between two transport parts 7.

The stretching profile described can be selected as desired within the stretching zone R.

After leaving the treatment portion, the overall pulling assembly LOK is dismantled after the discharge AR, and the individual transport parts and associated individual clips are activated as in normal operation.

In the following, reference is made to a modified embodiment, specifically with reference to FIG. 9, which shows a schematic embodiment that is modified compared with FIG. 7.

In this embodiment, too, a leading initial portion of a material web to be stretched, specifically an initial film portion CWL, is not subjected to the acceleration in the longitudinal direction MD that occurs during normal operation and increases from the start of the stretching zone to the end of the stretching zone. Unlike in the previous embodiments in which an overall pulling assembly LOK was formed (in the region of which longitudinal stretching in the MD stretching direction does not occur at all), this embodiment provides for a different acceleration profile to be used here between at least two successive leading active, i.e. driven, transport units T having transport parts 7 and associated clips 6. In this case, an acceleration profile is used in which a lower relative acceleration is carried out compared with normal operation, with respect to an initial material web portion CWL guided through the stretching zone R, with the result that the corresponding MDx_y value at least between the two first successive and thus leading actively driven transport units T having the transport parts 7 and the associated clips 6 is smaller than a usual spacing MD between two successive driven transport parts/clips that is dependent on the position (zone) within the stretching zone R and represents a measure for the acceleration, as is shown in FIG. 7 by indicating the value MD4_5, MD5_6 and MD6_7.

In other words, the linear-motor-driven simultaneous stretching apparatus is started up such that, when the material web F enters the stretching zone R, at least two successive leading clips 6 driven by the linear motor are accelerated in the stretching zone R in a manner differing from the acceleration profile during normal operation such that the spacing MDa_b formed between the at least two successive linear-motor-driven clips 6 is less than 80% or 75%, in particular less than 70%, 60%, 50%, 40%, 30%, 20% and in particular less than 10% compared with the corresponding position-dependent and/or zone-dependent spacing MDx_y during normal operation.

The invention claimed is:

1. A method for operating a linear-motor-driven plastics film simultaneous stretching apparatus comprising:
a plurality of linear-motor-driven transport units each equipped with transport parts and clips configured to move along a guide track and/or a transport rail via a linear motor drive,
wherein the clips are each configured to grasp and retain an edge of a material web,
the method for operating the linear-motor-driven plastics film simultaneous stretching apparatus comprising a first normal operation and a second operation different from the first normal operation, the second operation occurring before the first normal operation and at a start of the method for operating the linear-motor-driven plastics film simultaneous stretching apparatus when the material web enters a simultaneous stretching zone, the method comprising the steps of:
operating the linear motor drive, during the first normal operation, to subject at least two successive linear-motor-driven transport units in a simultaneous stretching zone to an acceleration phase having a normal operation acceleration profile, in which a spacing between the at least two successive linear-motor-driven transport units driven by the linear motor drive increases, and
operating the linear motor drive, during the second operation different from the first normal operation, to drive at least two successive linear-motor-driven transport units to accelerate in the simultaneous stretching zone such that the at least two successive linear-motor-driven transport units driven by a linear motor drive are driven in the simultaneous stretching zone at the same speed and acceleration at a constant relative spacing from one another.

2. The method for operating a linear-motor-driven simultaneous stretching apparatus according to claim 1, wherein the at least two successive linear-motor-driven transport units that pull a material web into the stretching zone and actively drive said web are activated such that, in a region of the stretching zone, the spacing between the at least two successive linear-motor-driven transport units driven by the linear motor drive is less than 70% compared with the corresponding position-dependent and/or zone-dependent spacing during the first normal operation.

3. The method for operating a linear-motor-driven simultaneous stretching apparatus according to claim 1, wherein the at least two successive linear-motor-driven transport units driven by the linear motor during the second operation, and the associated clips, travel through at least 80% of the simultaneous stretching zone so as to be in contact with one another, such that the spacing is 0.

4. The method for operating a linear-motor-driven simultaneous stretching apparatus according to claim 1, wherein, during the first operation and the second operation, at least one non-driven transport unit exists between the at least two successive linear-motor-driven transport units driven by the linear motor, wherein the at least one non-driven transport unit moves in succession between and together with the at least two successive linear-motor-driven transport units that are driven by the linear motor and the associated clips.

5. The method for operating a linear-motor-driven simultaneous stretching apparatus according to claim 1, wherein, during the first operation or the second operation, at least one non-driven transport unit exists between the at least two successive linear-motor-driven transport units driven by the linear motor, wherein the at least one non-driven transport unit moves in succession between and together with the at least two successive linear-motor-driven transport units that are driven by the linear motor and the associated clips through the stretching zone and a discharge zone together as an overall pulling assembly.

6. The method for operating a linear-motor-driven simultaneous stretching apparatus according to claim 5, wherein, during the first operation or the second operation, the overall pulling assembly travels through the stretching zone so as to have an acceleration profile that corresponds to the acceleration profile of a last trailing transport unit belonging to the overall pulling assembly.

7. The method for operating a linear-motor-driven simultaneous stretching apparatus according to claim 1, wherein, during the second operation, the at least two successive linear-motor-driven transport units that pull a material web into the stretching zone and actively drive said web are activated such that, in a region of the stretching zone, the spacing between the at least two successive units driven by the linear motor drive is less than 10% compared with the corresponding position-dependent and/or zone-dependent spacing during the first normal operation.

8. The method for operating a linear-motor-driven simultaneous stretching apparatus according to claim 1, wherein an activation is carried out such that two transport units driven by a linear motor, and the associated clips, travel through at least 90% of the simultaneous stretching zone so as to be in contact with one another at a spacing reduced to 0.

9. The method for operating a linear-motor-driven simultaneous stretching apparatus according to claim 1, wherein the at least two successive linear-motor-driven transport units driven by a linear motor during the second operation, and the associated clips, travel through at least 100% of the simultaneous stretching zone so as to be in contact with one another at a spacing reduced to 0.

10. A method for operating a linear-motor-driven plastics film simultaneous stretching apparatus comprising:
- a plurality of linear-motor-driven transport units each equipped with transport parts and clips configured to move along a guide track and/or a transport rail via a linear motor drive,
- wherein the clips are each configured to grasp and retain an edge of a material web,
- the method for operating the linear-motor-driven plastics film simultaneous stretching apparatus comprising a first normal operation and a second operation different from the first normal operation, the second operation occurring before the first normal operation and at a start of the method for operating the linear-motor-driven plastics film simultaneous stretching apparatus when the material web enters a simultaneous stretching zone, the method comprising the steps of:
- operating the linear motor drive, during the first normal operation, to subject at least two successive linear-motor-driven transport units in a simultaneous stretching zone to an acceleration phase having a normal operation acceleration profile, in which a spacing between the at least two successive linear-motor-driven transport units driven by the linear motor drive increases, and
- operating the linear motor drive, during the second operation different from the first normal operation, to drive at least two successive linear-motor-driven transport units to accelerate in the simultaneous stretching zone such that the two successive linear-motor-driven transport units that are driven by the linear motor are accelerated in the simultaneous stretching zone in a manner differing from the acceleration profile during the first normal operation, wherein the spacing formed between the at least two successive linear-motor-driven transport units is less than 10% of the spacing produced during the first normal operation,
- wherein a plurality of frequency converters and thus zones are synchronized with each other to have the at least two successive linear-motor-driven transport units simultaneously synchronized with each other and accelerated or moved together with the respectively associated individual clips.

* * * * *